(12) United States Patent
Thomas

(10) Patent No.: US 8,573,104 B2
(45) Date of Patent: Nov. 5, 2013

(54) MITER DETENT OVERRIDE MECHANISM

(75) Inventor: Adam S. Thomas, Aurora, IL (US)

(73) Assignee: Robert Bosch GmbH, Stuttgart (DE)

( * ) Notice: Subject to any disclaimer, the term of this patent is extended or adjusted under 35 U.S.C. 154(b) by 828 days.

(21) Appl. No.: 12/683,760

(22) Filed: Jan. 7, 2010

(65) Prior Publication Data
US 2011/0162502 A1 Jul. 7, 2011

(51) Int. Cl.
B26D 1/14 (2006.01)
B23D 33/02 (2006.01)

(52) U.S. Cl.
USPC .......................................... 83/471.3; 83/477

(58) Field of Classification Search
USPC ............................. 83/471.2–477.1
See application file for complete search history.

(56) References Cited

U.S. PATENT DOCUMENTS

| 5,249,496 A | 10/1993 | Hirsch et al. |
| 5,647,130 A * | 7/1997 | Collins ........................... 30/151 |
| 5,819,624 A | 10/1998 | Brault et al. |
| 6,016,732 A | 1/2000 | Brault et al. |
| 6,810,780 B2 | 11/2004 | Ceroll et al. |
| 7,114,425 B2 * | 10/2006 | Romo et al. ................. 83/471.3 |

FOREIGN PATENT DOCUMENTS

DE 8200064 A1 * 4/1981

* cited by examiner

Primary Examiner — Boyer D Ashley
Assistant Examiner — Samuel A Davies
(74) Attorney, Agent, or Firm — Maginot, Moore & Beck

(57) ABSTRACT

Embodiments of the invention are directed to a miter saw comprising a base with a plurality of detents, a rotatable table mounted to the base, the table having a front handle portion configured to enable a user to angularly adjust the position of the table relative to the base, a detent system mounted to the table and comprising a moveable lever with a gripping portion and a detent pin on the opposite end thereof selectively engaging the detents, and a detent override mechanism for retaining the lever and detent pin out of engagement with the detents, the override mechanism comprising a moveable button positioned on the top of the handle portion, whereby a user can grasp the handle portion and gripping portion with one hand and move the button with the thumb to retain the lever and associated detent pin out of engagement with any of the detents.

21 Claims, 15 Drawing Sheets

MITER DETENT OVERRIDE MECHANISM

BACKGROUND OF THE INVENTION

The present invention generally relates to power miter saws.

Most miter saws provide the user with a set of predetermined miter angles that define commonly used angles in carpentry. The angles are typically defined by a set of detents in the base of the miter saw. A moveable detent pin housed in the rotating table of the miter saw selectively engages the detents to angularly position the table at a desired angle.

In certain cases, it is desirable to disengage the miter detent system. This is most commonly desired when a cut needs to be made at an angle that is close to a specific detent defined angle. For example, if the user attempts to set the saw one degree away from the forty-five degree detent, the detent system often pulls the saw back to forty-five degrees. This happens because more than half of the detent pin is aligned with the forty-five degree detent. The spring force on the pin moves the saw back to the detent.

To overcome this problem, many miter saws provide the user with a mechanism to disengage the detent pin. Many known mechanisms are difficult to locate on the saw, so much so that many users are completely unaware of the feature. At the same time, many users say this feature is a highly desirable one when asked.

SUMMARY OF THE INVENTION

Embodiments of the invention are directed to a miter saw comprising a base having a center pivot and a plurality of detents concentrically arranged at spaced angular positions at a generally predetermined distance from the center pivot, a table mounted to the base and configured to be rotatable around the center pivot, the table having a front extension with a handle portion configured to enable a user to angularly adjust the position of the table relative to the base, a detent system mounted to the table and comprising a moveable lever with a gripping portion located below and adjacent to the handle portion, the lever having an associated detent pin, the detent pin being configured to selectively engage the detents to hold the table at a predetermined angular position when engaged with one of the detents, a spring configured to bias the moveable lever and associated detent pin toward engagement with the detents, and a detent override mechanism for retaining the moveable lever and associated detent out of engagement with the detents, the override mechanism comprising a moveable button positioned on the top of the handle portion, whereby a user can grasp the handle portion and gripping portion and move the lever with one hand and simultaneously move the button with the thumb of the one hand to retain the lever and associated detent pin out of engagement with any of the detents.

DETAILED DESCRIPTION

Embodiments of the present invention are directed to a miter saw having a detent override system which provides a new way to disengage a miter detent system of a power miter saw. The controls for the override system have been designed and configured to be in the line of sight of a user and the operative controls for engaging the override system is significantly larger than most known systems. The miter detent system as well as the detent override system is designed and configured to be conveniently operated by a user using only one hand.

Figure 1:
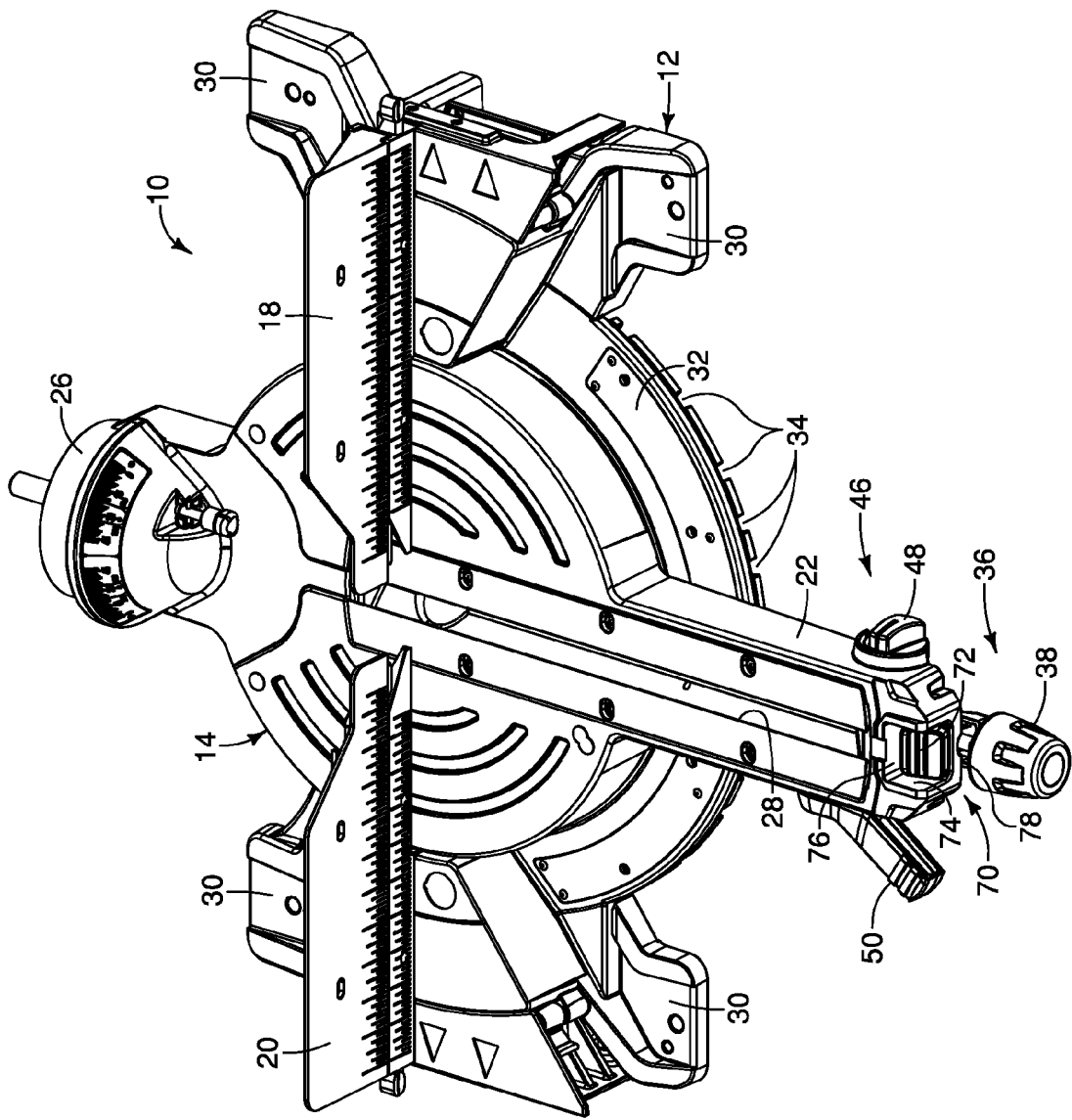
FIG. 1 is a perspective view of a portion of a power miter saw when viewed from a right front elevated perspective, particularly illustrating the base with a rotatable table attached thereto and illustrating an embodiment of the present invention.
Figure 2:
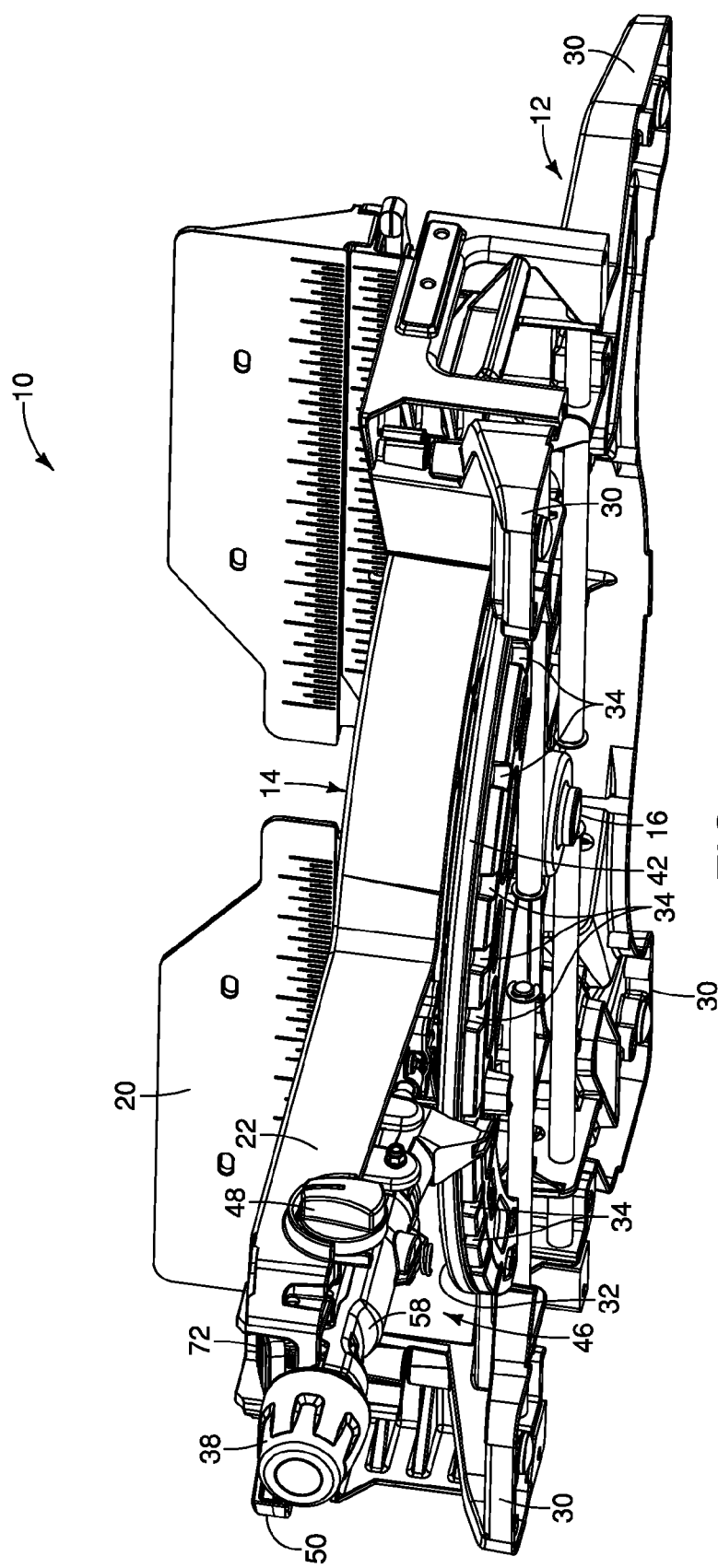
FIG. 2 is a perspective view of the portion of a miter saw shown in FIG. 1, when viewed from the bottom front of the miter saw.

Turning now to the drawings, and particularly FIGS. 1 and 2, components of a power miter saw are illustrated and are indicated generally at 10. The saw 10 includes a base, indicated generally at 12, as well as a rotatable table, indicated generally at 14, that is rotatable thereon about a horizontal pivot connection 16 as shown in FIG. 2. The saw has fence sections 18 and 20 that are attached to the base 12. The table 14 has a front extension 22 that defines a handle portion which a user can manipulate to horizontally rotate the table about the pivot connection 16 to adjust the miter angle of a cut that could be made on a work piece that may be placed on the top of the table 14.

The table has a rear hub portion 26 to which a motor and blade assembly would normally be connected, these components not being shown because they are not particularly relevant to the present invention. The table 14 has a slot 28 which is aligned to receive a blade to a shallow depth to be able to make complete cuts through the work piece. As is readily apparent, if the front extension 22 is moved horizontally to the right or the left, the angle of the cut relative to the fence portions 18 and 20 will change.

The base 12 has four corner leg portions 30 and a generally circular shaped center portion 32 in which a plurality of detents 34 are formed, with the detents being spaced apart from one another and located at specific angular positions that correspond to commonly used angles, such as 45°, 30°, 22½°, for example, as is well known to those of ordinary skill in the art.

Figure 4:
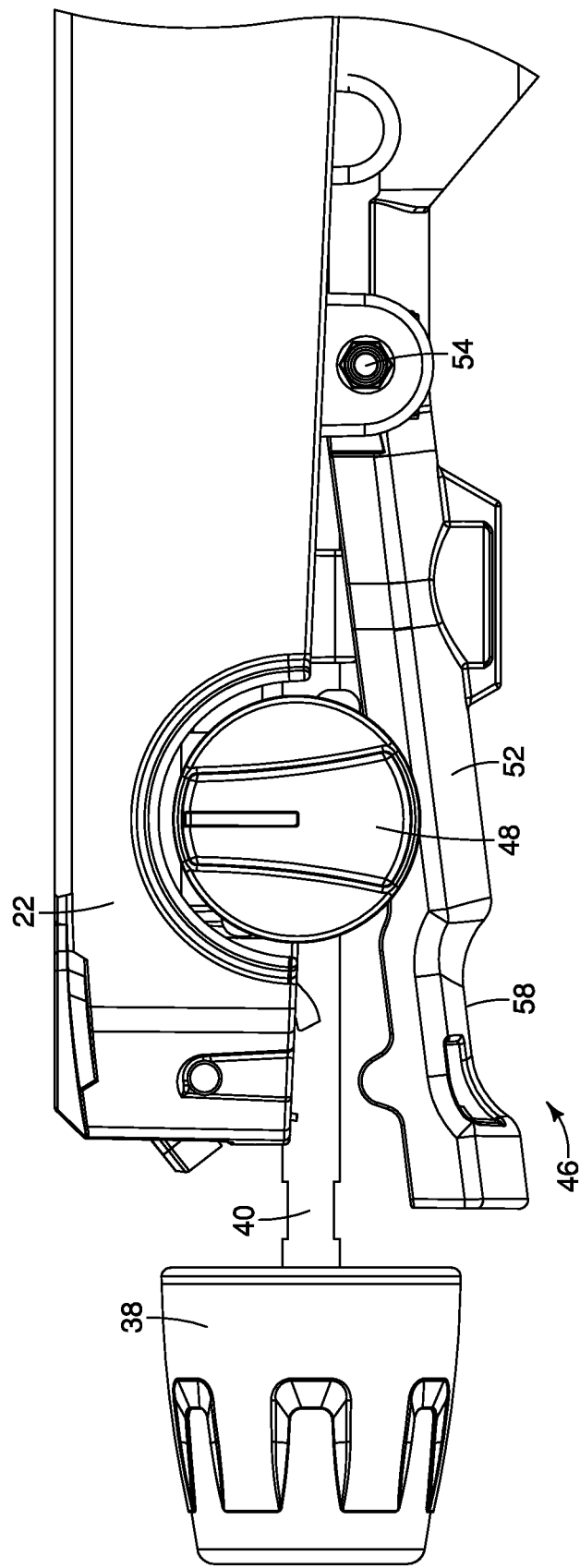
FIG. 4 is a side elevation from the right side as viewed in FIG. 1 showing a portion of the preferred embodiment of the present invention.
Figure 5:
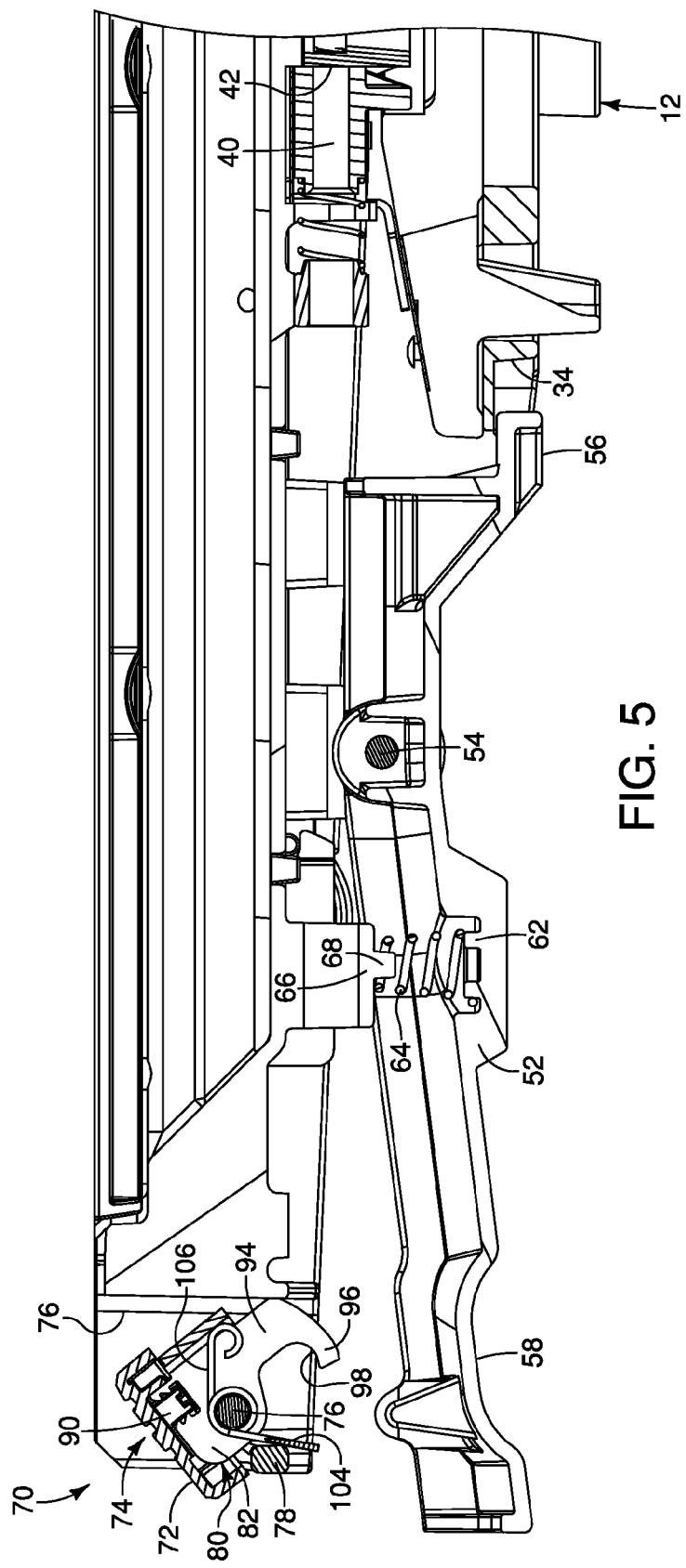
FIG. 5 is a cross section of a right side view of a portion of the preferred embodiment of the present invention particularly illustrating the detent system with a detent pin inserted in a detent in the base and illustrating the detent override button in a non-engaged position.

The front extension 22 has a gripping portion, indicated generally at 36, and generally comprised of an enlarged miter lock knob 38 which is attached to an elongated rod 40 that is threadably mounted in the front extension 22 and extends inwardly toward the pivot connection 16 to an outer surface 42 of the center portion 32 as shown in FIGS. 4 and 5, for example. The knob 38 may be rotated in a clockwise direction to cause the rod 40 to move into engagement with the surface 42 and lock the table 14 in a desired angular position. This is often used when the desired position of the table is other than in one of the predetermined angular positions defined by the detents 34. During operation, a user would generally have his palm in contact with the knob 38 while manipulating a detent system, indicated generally at 46, that is shown in several of the figures including FIGS. 1, 4, 5, 6 and 7. Before describing the detent system 46 in detail, and referring again to FIG. 1, the miter saw 10 has a bevel position setting knob 48 and a bevel locking handle 50 located near the gripping portion 46, but these components are not in and of themselves a part of the present invention.

Figure 3:
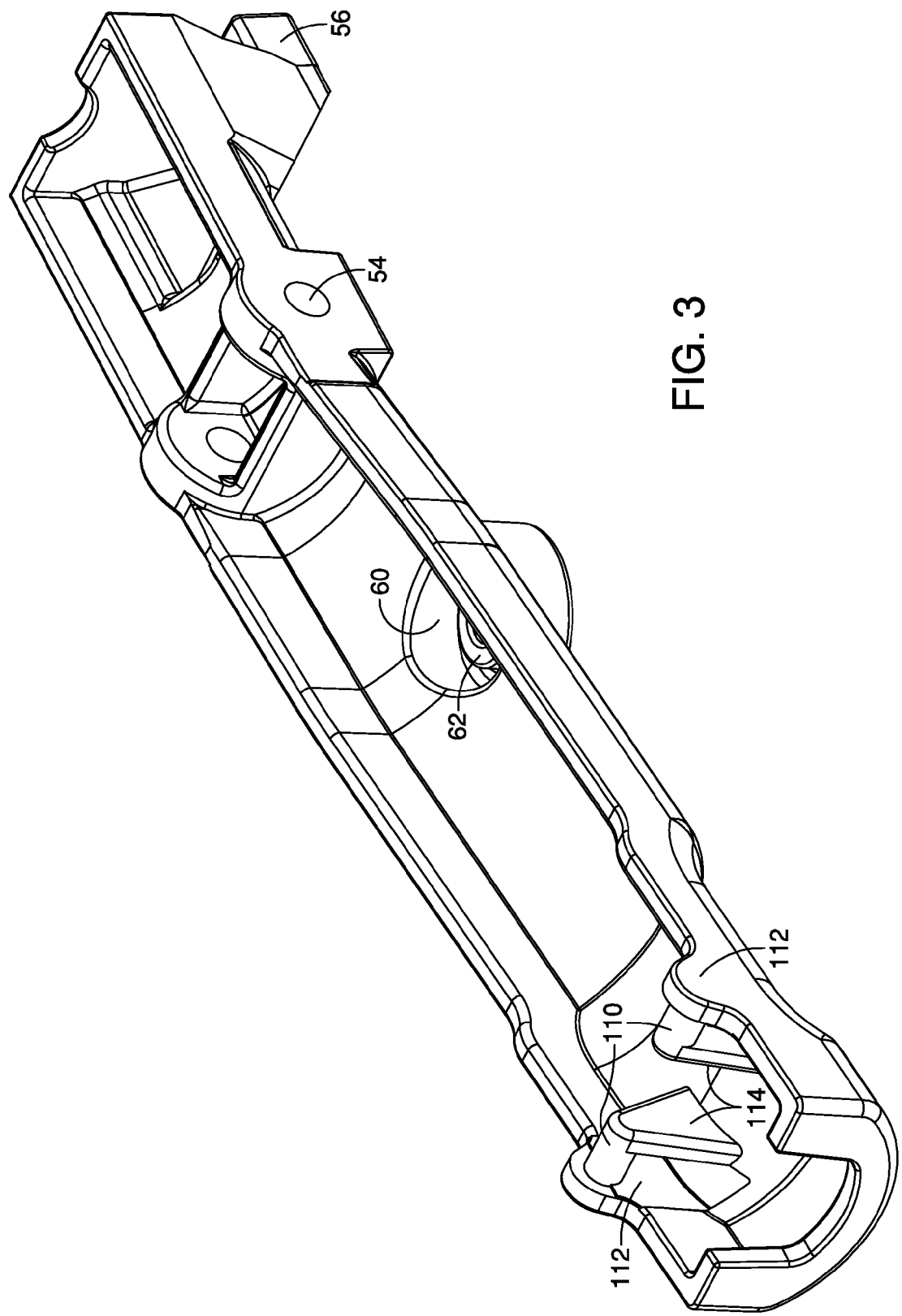
FIG. 3 is a perspective view of a portion of the embodiment shown in FIG. 1, and particularly illustrating a detent lever thereof.
Figure 7:
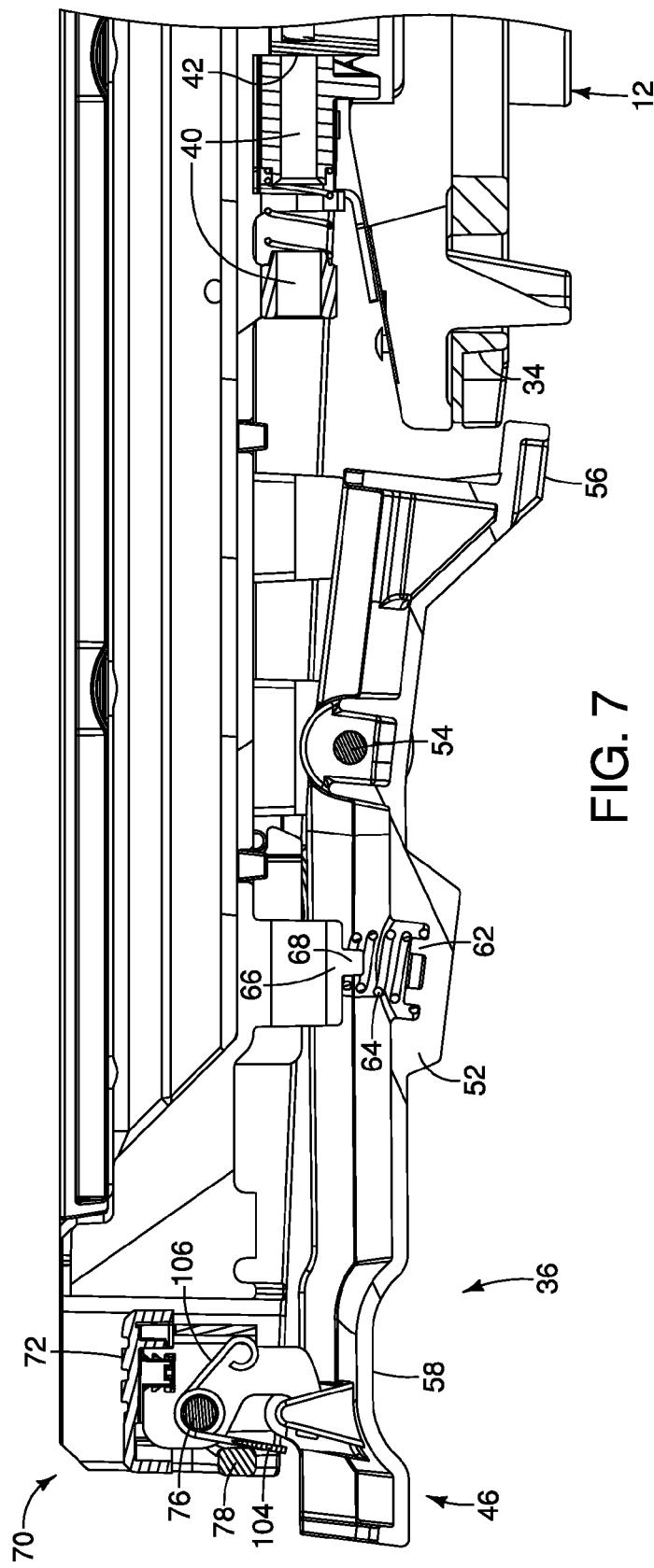
FIG. 7 is a view similar to FIG. 6, but particularly illustrating a detent override mechanism engaged to prevent the detent system from being inserted into any of the detents.

The detent system 46 includes a detent lever 52 which is shown in detail in FIG. 3 and has installed as shown in many of the other figures. It is elongated and has a pivot connection, indicated generally at 54, which is approximately one-third of the length of the lever 52 as is best illustrated in FIG. 7, for example. The lever 52 has an inner end which includes a detent pin 56 which is shaped and configured to snuggly fit into any one of the detents 34 to hold the table at a predetermined angular position when the pin is inserted into a detent 34.

The outer end of the lever 52 has a gripping surface 58 which is slightly recessed to provide a comfortable gripping surface for a user's fingers. The gripping surface 58 is conveniently positioned so that when a user has his or her palm of either hand on the knob 38, the fingers of the user will be in position to grasp the gripping surface 58 and can pull the lever upwardly and pivot it about the pivot connection 54.

As shown in FIG. 5, the lever 52 is released so that the detent pin 56 is engaged with one of the detents 34 whereas when the user pulls the outer end of the detent lever upwardly, the detent pin 56 is disengaged from the detent 34. When disengaged, the table can be rotated to a different desired angular position relative to the base 12 and the fences 18 and 20.

As is best shown in FIGS. 3 and 4, the lever 52 has a generally cylindrical lower chamber 60 with a raised hub 62 in which the bottom of a compression spring 64 is positioned. The upper end of the spring 64 is in contact with an downward extension 66 of the table and the upper end of the spring 64 fits around another hub 68. The spring 64 is located between the gripping surface 58 and the pivot connection 54 and is thereby positioned to bias the outer end portion of the lever 52 downwardly and thereby biases the detent pin 56 toward or into engagement with a detent 34.

As previously mentioned, when a user wishes to make a cut that is close to one of the predetermined detent angular positions, it is often difficult to accurately position the table to do so because the bias of the spring 64 tends to urge the detent pin 56 into a closely located detent 34.

Accordingly, it is desirable to be able to override the detent system 46. While many miter saws have this capability, the mechanism for doing so is often inconveniently located and inconveniently operated. In some instances, a user may not even be aware that such capability exists because the mechanism is not readily visible to a user.

In accordance with the present invention, a detent override mechanism is provided at the outer end of the front extension 22, and is located at the top portion of it in clear view to a user. The detent override mechanism 70 has a detent override button 72 that is located within a recess defined by a pair of side walls 74, a rear wall 76 and a lower front wall 78. The button 72 is conveniently located so that a user can depress it with his or her thumb while gripping the gripping surface 58 of the lever 52 when the user's palm is resting on the miter lock knob 38. This is the case regardless of whether the user uses his or her right or left hand.

Figure 10:
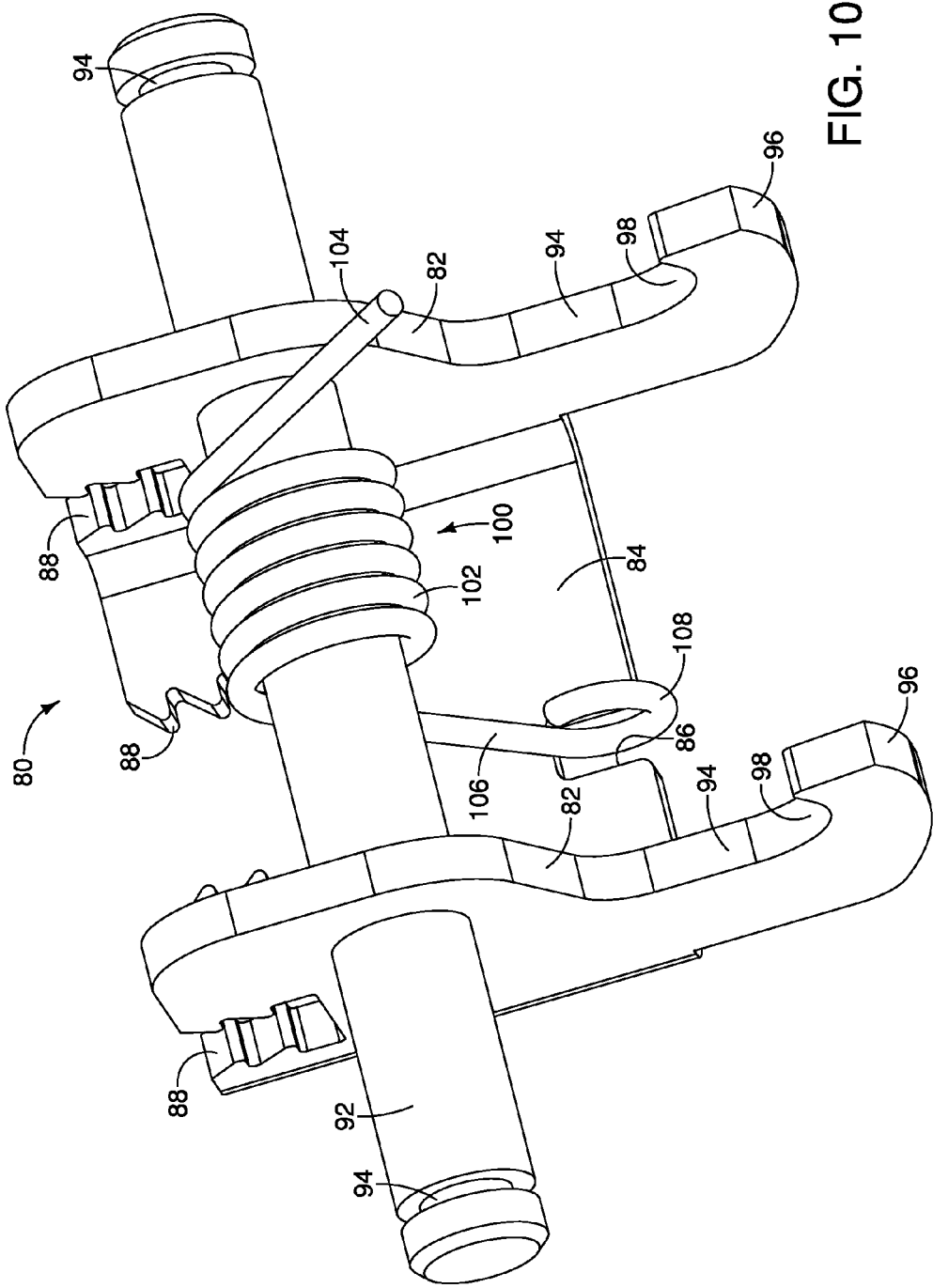
FIG. 10 is a perspective view of a portion of the detent override mechanism portion of the preferred embodiment shown in FIG. 1.

The button 72 is mounted on a hook structure 80 that is best shown in FIG. 10 which has sidewalls 82, a rear wall 84 that has a recess 86 near the bottom portion thereof. The hook structure 80 has three upper recesses 88 with serrated edges that are configured to retain downward extensions 90 on the inside of the button 72 when the button is snap fit over the hook structure 80. The material of the button is preferably Polyoxymethylene which is also known as Acetal, a plastic material with a degree of flexibility enabling it to be press fit onto the hook structure so that the button material engages the jagged recesses and is retained therein. Other suitable plastic or plastic-like materials may be used. The hook structure is preferably made of steel or other suitable metal.

Figure 6:
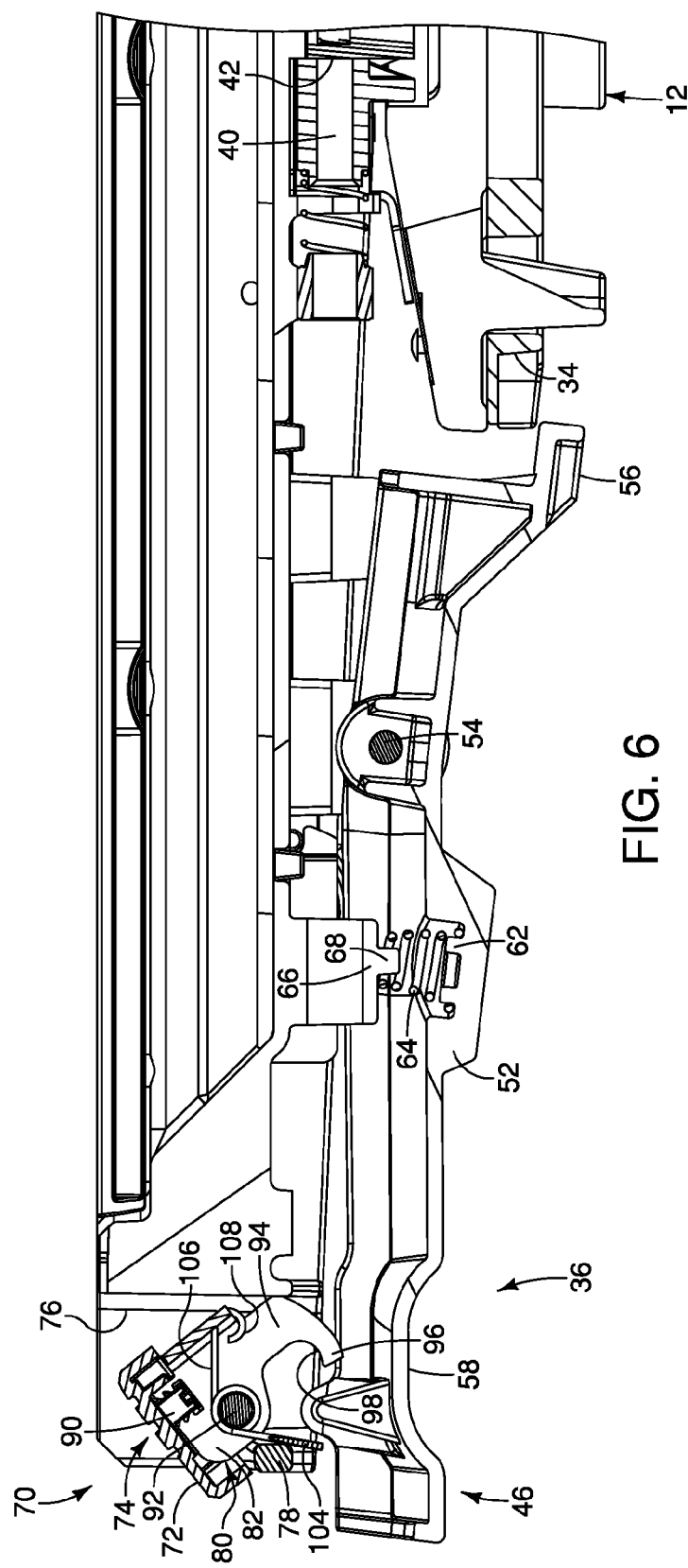
FIG. 6 is a side view similar to FIG. 5, but particularly illustrating the detent system with the detent lever positioned so that the detent pin is removed from a detent in the base.

The sidewalls 82 of the hook structure 80 have apertures for receiving a pivot shaft 92 and the pivot shaft 92 also extends through apertures in the sidewalls 74 that define the chamber in which the detent override mechanism is mounted. As shown in FIG. 10, the shaft 92 has an annular recess 94 located on each end thereof for receiving a retaining clip to hold the shaft in place. A lower portion 94 of the sidewalls 82 are narrower and have transverse hook portions 96 with a curved upper surface 98. As best shown in FIG. 10, a detent override spring, indicated generally at 100, has a center coil portion 102, a straight end portion 104, and an opposite end straight portion 106 with a curled end 108 that fits within the recess 86. As shown in the cross-sectional views of FIGS. 5, 6 and 7, the straight section 106 bears against the rear wall 84 of the hook structure and the opposite end 104 goes against the front wall 78. Thus, the spring 100 biases the button and hook structure 80 in a counterclockwise direction as shown in FIGS. 5, 6 and 7.

Figure 8:
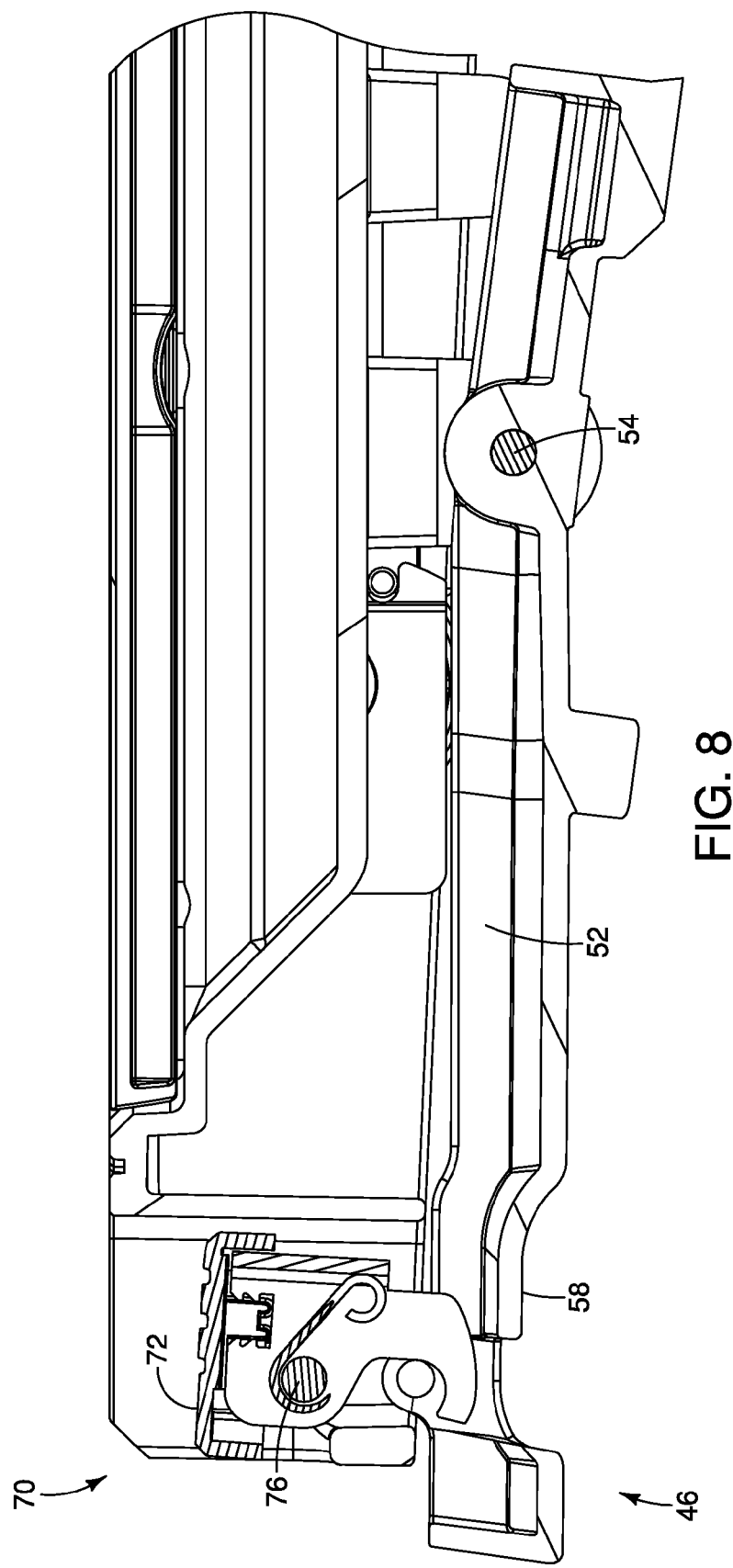
FIG. 8 is a view similar to FIG. 7, but having portions thereof shown in cross section.
Figure 9:
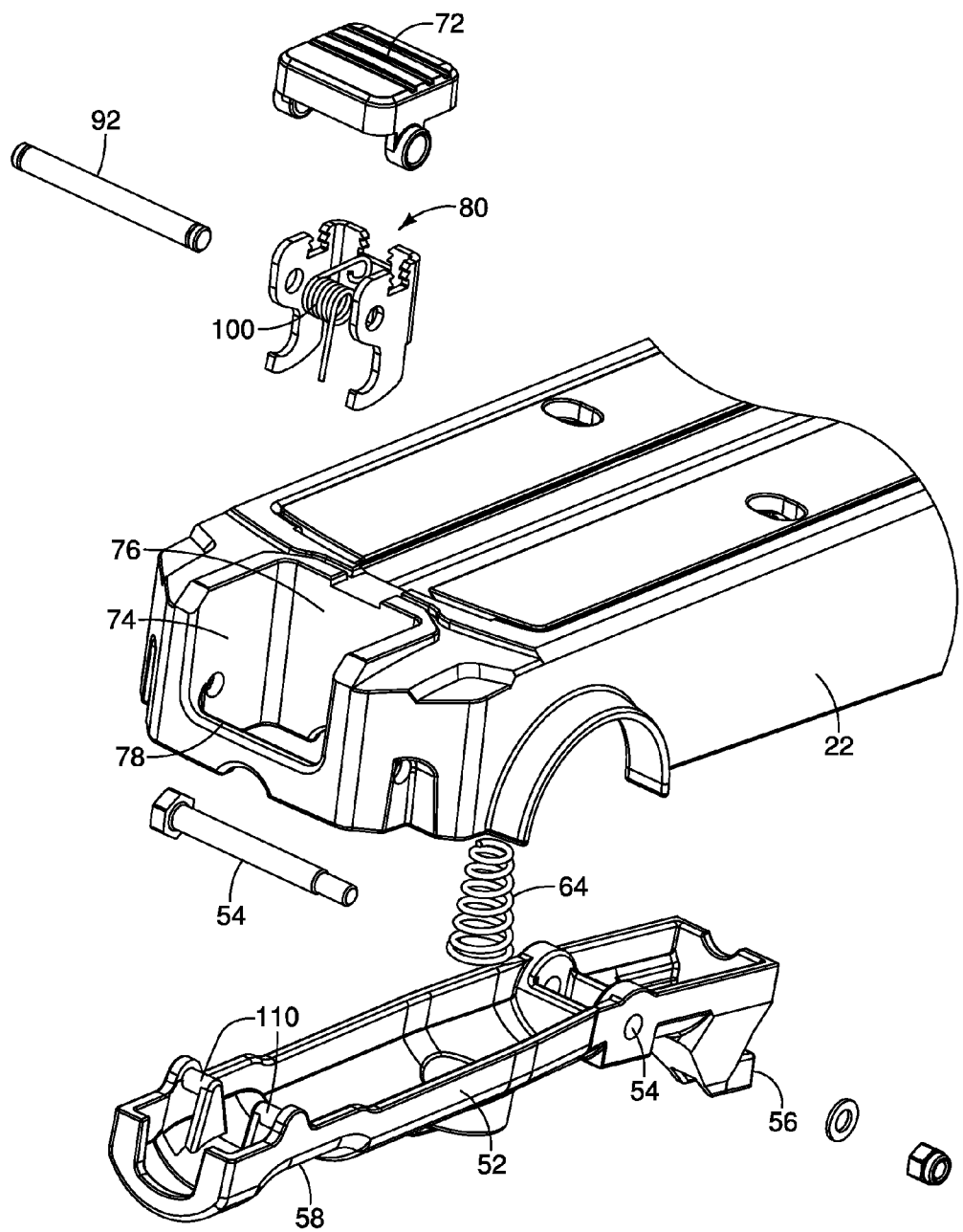
FIG. 9 is an exploded perspective of the preferred embodiment shown in FIG. 1.

The detent override mechanism 70 is configured to have the transverse hooks 96 interact with the lever 52 to hold it so that its detent pin 56 is out of engagement with any of the detents 34. This is achieved by the configuration of the outer end of the lever that has the gripping surface 58, which as is best shown in FIG. 3 has a pair of spaced apart cylindrically shaped detent pins 110 that are supported at opposite ends by an outside wall 112 and an interior support 114. The structure is preferably integrally molded and the length of the pins 110 is greater than the thickness of the hook structure sidewalls 82 so that the transverse hooks 94 can move underneath the pins 110 when the detent lever 52 is pivoted toward the override mechanism 70. It should be understood that the distance between the two internal supports 114 is greater than the diameter of the rod 40 so that the miter locking knob 38 and rod 40 are functional and not interfered with by the detent override mechanism 70. The mechanism is shown in its normal rest and unengaged position in FIG. 5 and in its engaged position in FIGS. 7 and 8.

To operate the miter detent override, the user firsts rests the palm of the hand on the miter lock knob. Next, the detent pin is disengaged by pivoting the lever 52, i.e., pulling up on it with one or more fingers. While holding the detent pin in the disengaged position, the detent override button is depressed by the user with his or her thumb. This causes the transverse override hooks 96 to move below the override pins 110. Finally, both the lever 52 and detent override button 72 are released. The spring force by the spring 64 on the detent lever 52 forces the override pins 110 down onto the transverse hooks 96. The hook and pin interaction holds the detent lever 52 in the position where the detent pin 56 is out of contact with any of the detents 34.

Releasing the miter detent override mechanism 70 only requires a single step. With the palm of the hand resting on the miter lock knob 38, the detent lever 52 is pulled upwards with one or more fingers. When the override pins 110 lose contact with the override hooks 96, the torsion spring 100 on the override button 72 moves the button to the disengaged position. This causes the override hooks 96 to clear from the path of the override pins 110. The detent lever 52 can now be released, and the detent system 46 can be used as normal.

A second preferred embodiment of the present invention is shown in FIGS. 11-15 which effectively show changes to the structure of the first preferred embodiment shown in FIGS. 1-10. Reference numbers of the first embodiment are either omitted because of the identity of structure or the same numbers are provided for the second preferred embodiment where they are identical components. Modified structural features will either be given the same number primed (') or a new number.

The second preferred embodiment modifies the detent override mechanism in such a way as to prevent depressing of the detent override button 72 unless and until the detent lever 52 is pulled toward the detent override mechanism sufficiently so that the transverse hooks 96 and 96' can engage the detent override pins 110 and hold the lever in the position where the detent pin 56 is out of engagement with any of the detents 34. This is achieved in part by modifying the structure of the rightward pin 110' shown in FIG. 15 to have an upward extension 120 that is configured to engage an elongated transverse hook portion 96' as shown in FIGS. 11-14.

Figure 14:
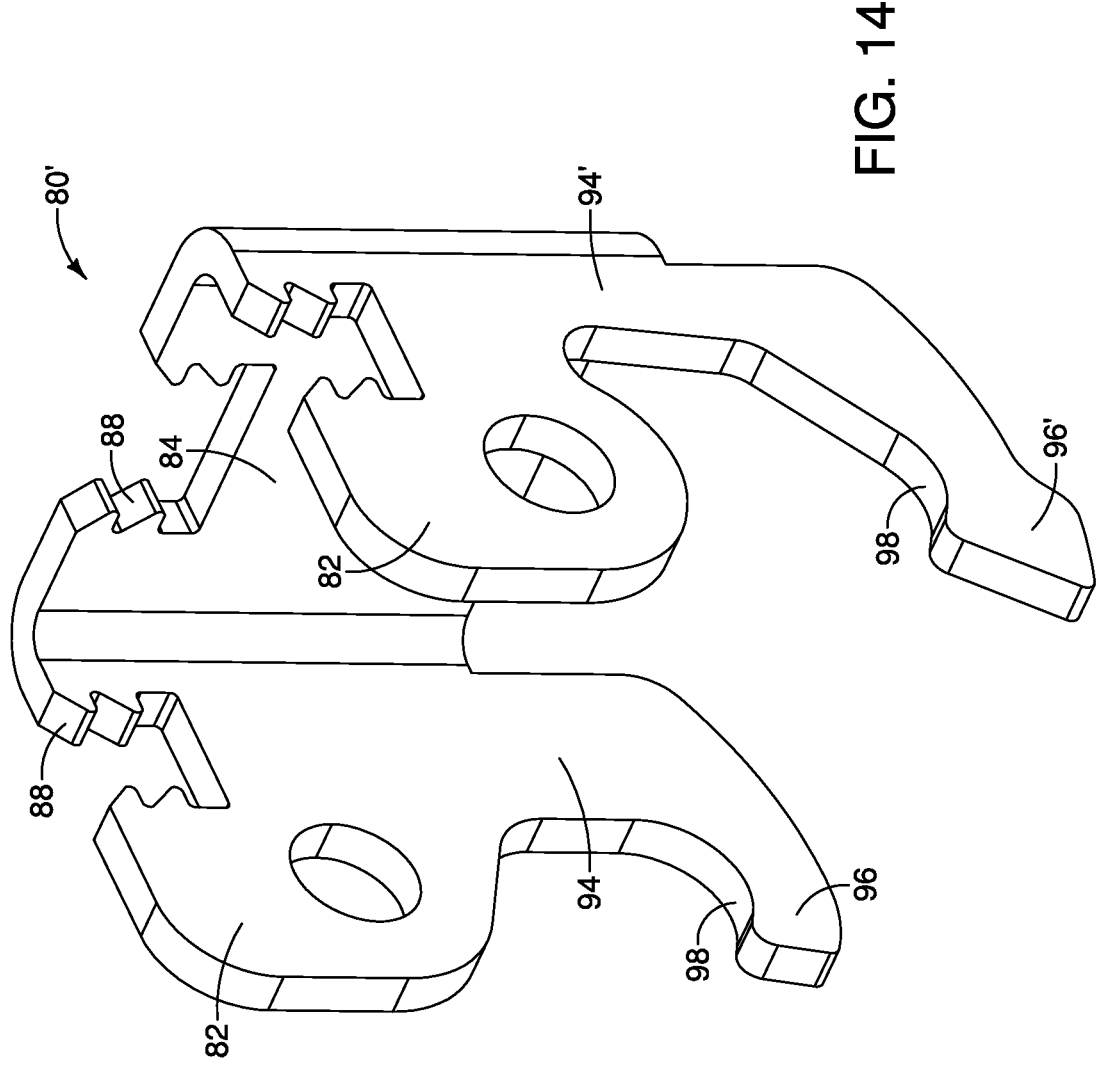
FIG. 14 is a perspective view of a portion of the detent override mechanism of the second preferred embodiment.
Figure 15:
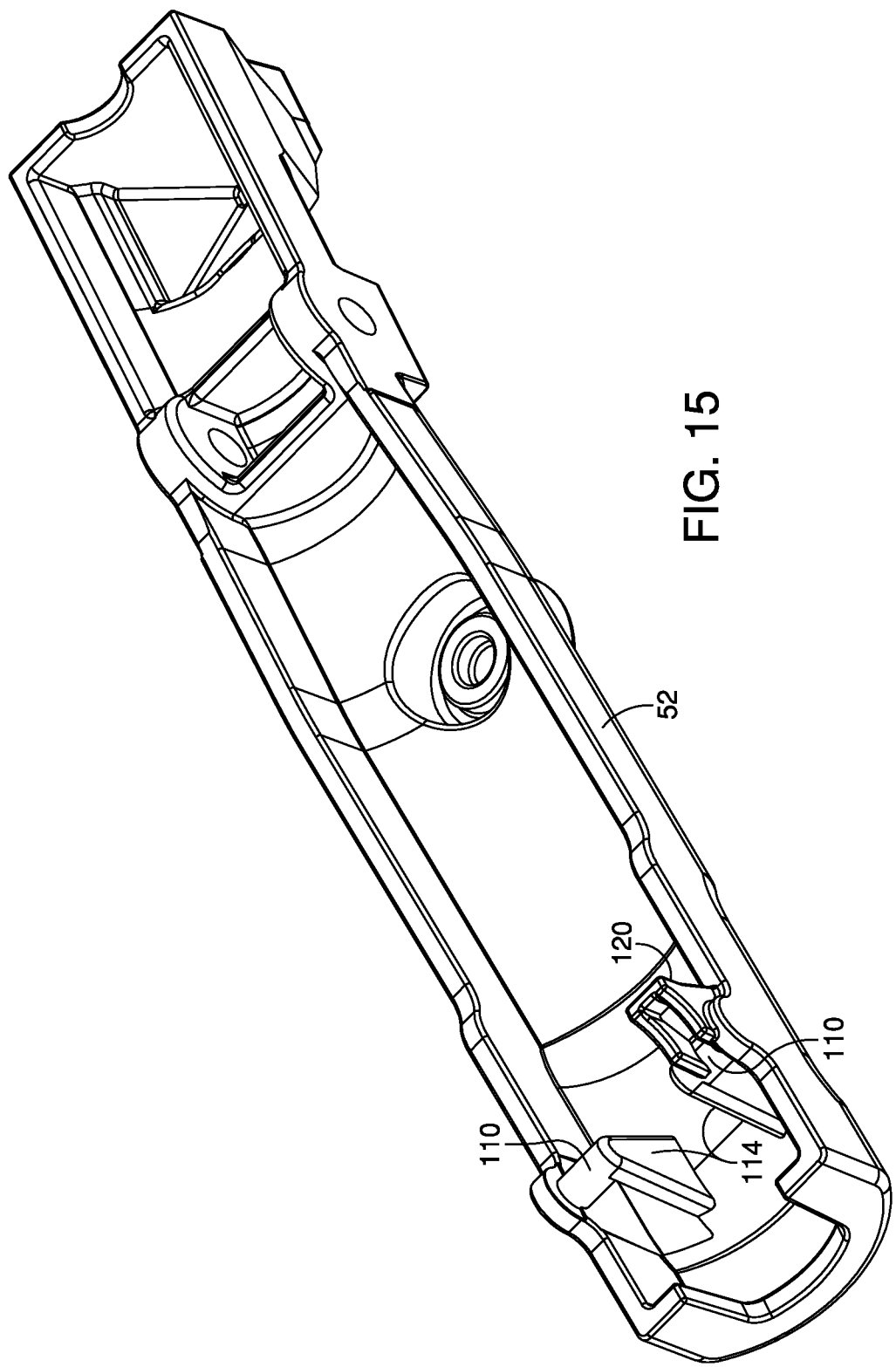
FIG. 15 is a perspective view of the detent lever of the second preferred embodiment.

In this regard, the rightward side wall as shown in FIG. 14 has a side wall portion 94' is narrowed more than the left side wall portion 94 to provide sufficient clearance from the extension 120 when the hooks 96 and 96' are engaged with the pins 110. The interaction of the extended transverse hook portion 96' together with the upward extension 120 prevents depression of the button 72 until the lever 52 is moved toward the detent override mechanism a sufficient distance to enable the transverse hook 96 and 96' to move underneath the pins 110 in position to hold the lever 52 in its override position.

Figure 11:
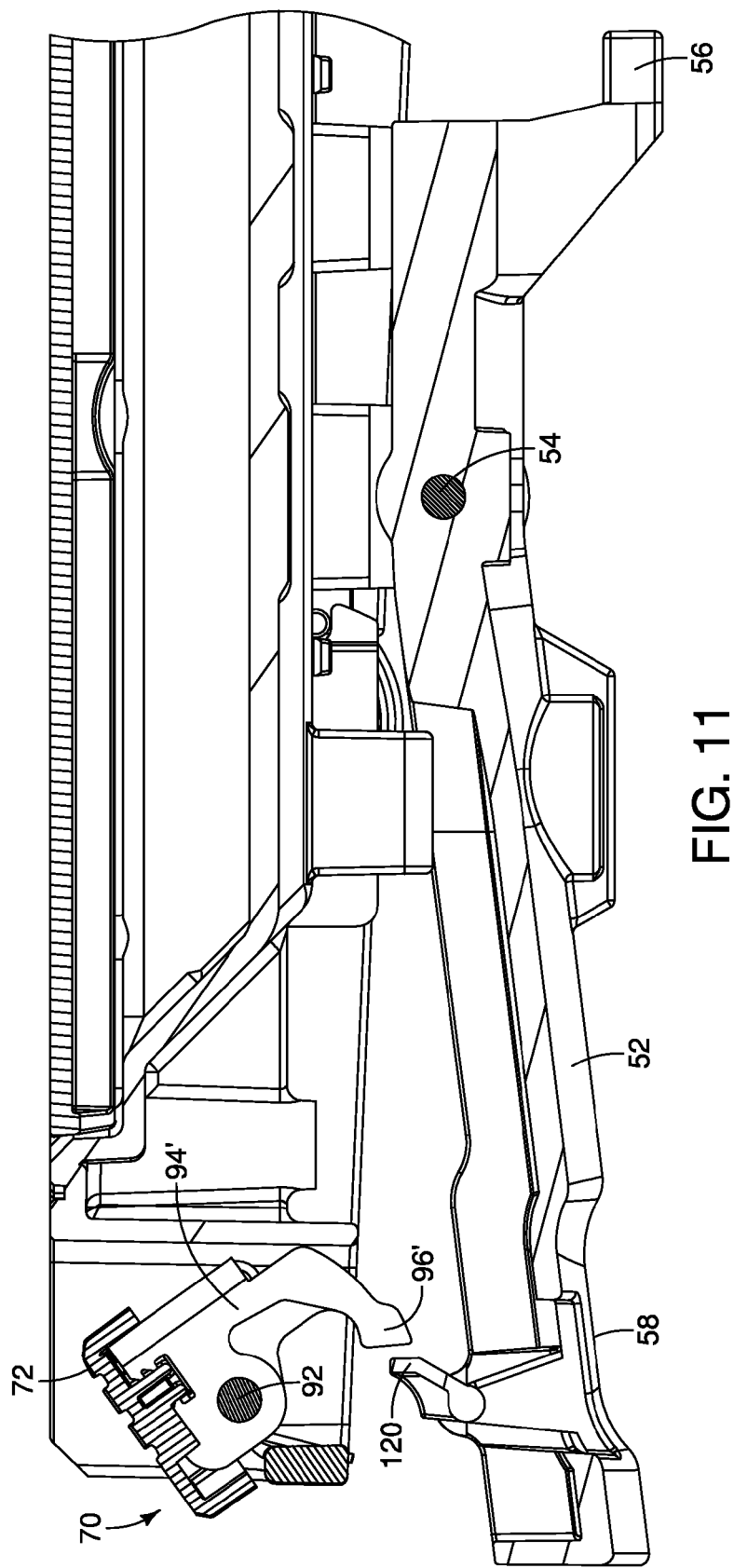
FIG. 11 is a view similar to FIG. 5 of a second preferred embodiment of the present invention, showing the detent override mechanism in a normal non-engaged position.
Figure 12:
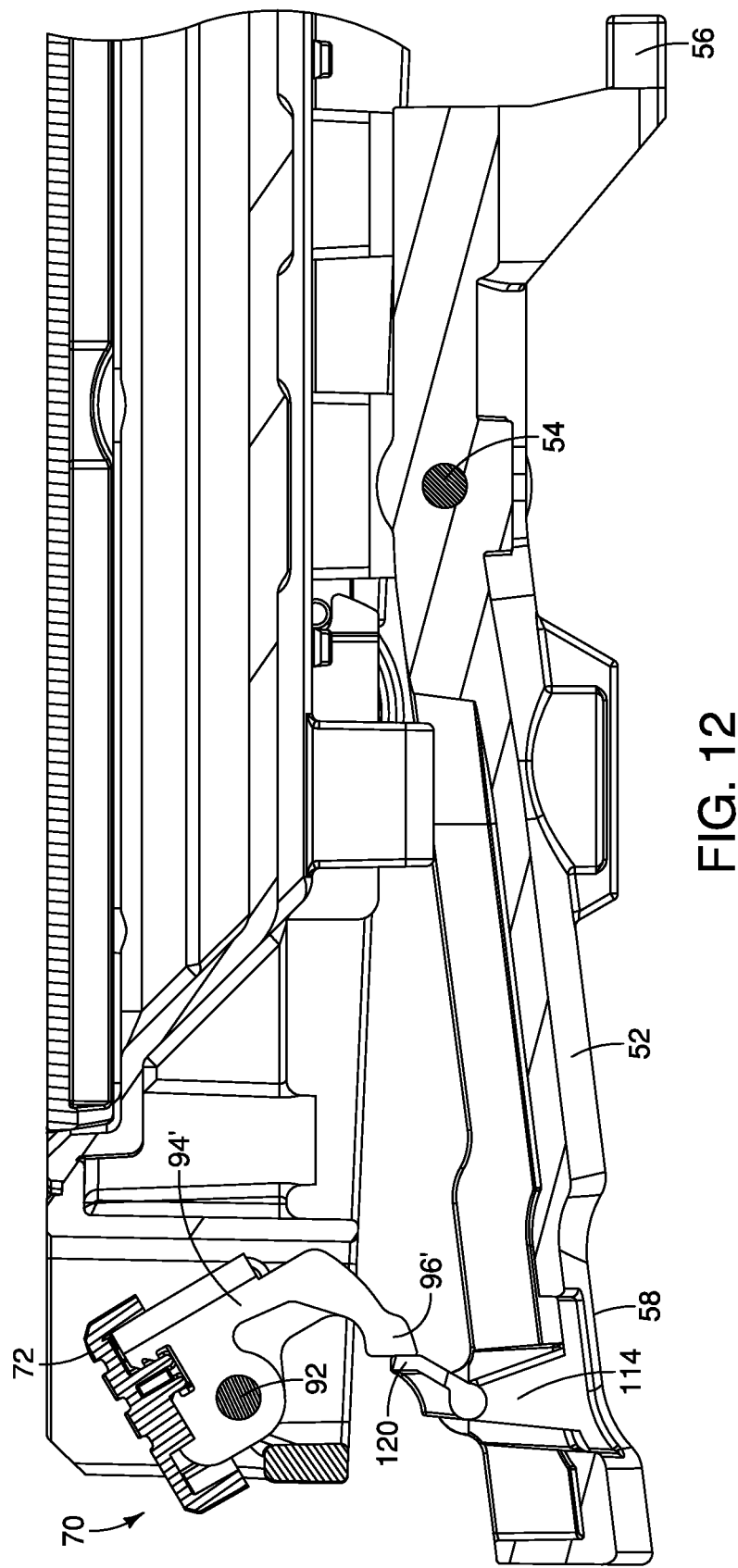
FIG. 12 is a view similar to FIG. 5 of the second preferred embodiment of the present invention, showing the detent override mechanism in a partially engaged position, wherein a detent override button is partially depressed.
Figure 13:
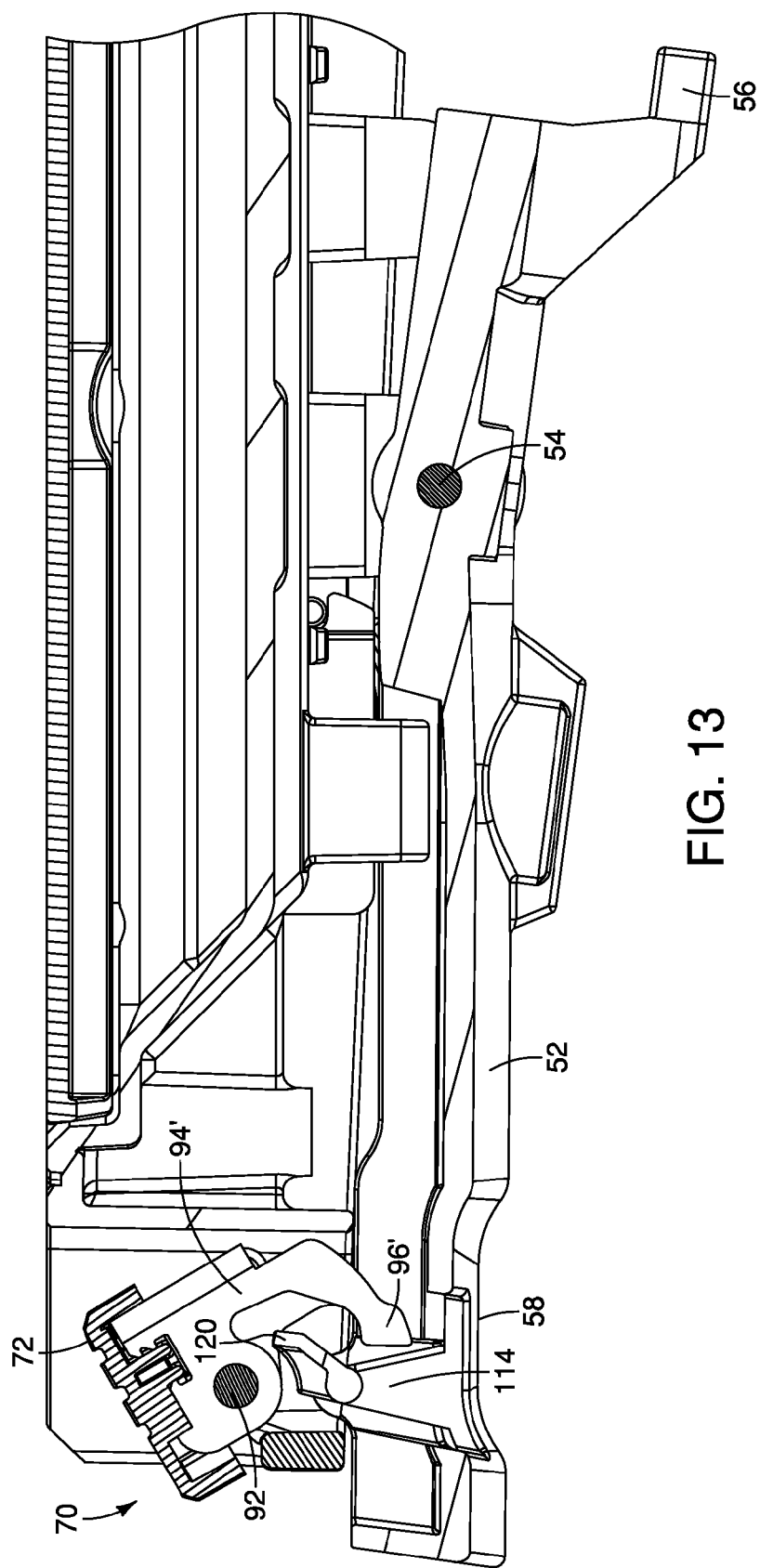
FIG. 13 is a view similar to FIG. 6 of the second preferred embodiment of the present invention, showing the detent override mechanism in a partially engaged position, wherein the detent lever is rotated so that a detent pin is disengaged from a detent and the detent override mechanism can be fully engaged.

The functionality can be understood by comparing FIGS. 11, 12 and 13 with one another. FIG. 11 shows the detent override mechanism 70 in its normal disengaged condition and the lever 52 in its biased normal position where the detent pin 56 is in a detent (not shown). In this condition, the end face of the transverse hook 96' is spaced away but generally coextensive with the extension 120 on the lever 52. As shown in FIG. 12, an attempt to depress the button 72 results in contact between the transverse hook 96' and the extension 120 which prevents further depression of the pushbutton 72. If the lever 52 is pivoted to the position where the detent pin 56 is disengaged from a detent 34, FIG. 13 illustrates that the transverse hook 96' is at an elevation where it will come in contact with the underside of the pins 110 as is desired. Thus, this embodiment prevents an unknowing user from incorrectly setting or attempting to set the detent override mechanism 70 by initially depressing the button 72 before the lever 52 is pivoted into position to be retained.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention.

Various features of the invention are set forth in the following claims.

What is claimed is:

1. A miter saw comprising:
   a base having a center pivot and a plurality of detents concentrically arranged at spaced angular positions at a generally predetermined distance from said center pivot;
   a table mounted to said base and configured to be rotatable around said center pivot, said table having a front extension with a handle portion configured to enable a user to angularly adjust the position of said table relative to said base, said front extension including a recess;
   a detent system mounted to said table and comprising a moveable lever with a gripping portion located below and adjacent to said handle portion, said lever having an associated detent pin, said detent pin being configured to selectively engage said detents to hold said table at a predetermined angular position when engaged with one of said detents;
   a spring configured to bias said moveable lever and associated detent pin toward engagement with said detents;
   a detent override mechanism for retaining said moveable lever and associated detent pin out of engagement with said detents, said override mechanism comprising a moveable button positioned on the top of said handle portion and a hook structure mounted on said moveable button and being pivotably mounted in said recess, said hook structure extending downwardly from said handle portion and configured to pivotably contact and hold said gripping end of said lever;
   whereby a user can grasp said handle portion and gripping portion and move said lever with one hand and simultaneously move said button with the thumb of the one hand to retain said lever and associated detent pin out of engagement with any of said detents, wherein said gripping portion has two detent override pins spaced apart from one another and generally aligned and formed in an upper region of said gripping portion and configured to be contacted and held by said hook structure when a user moves said moveable button while said gripping portion of said lever is moved toward said handle portion a sufficient distance so that said hook structure can contact and hold said two detent override pins, said hook structure having two spaced apart hook portions for contacting an underside of said two detent override pins.

2. The miter saw as defined in claim 1 wherein said moveable lever is elongated and is pivotably connected to said table at a lever pivot connection, said associated detent pin being located on an end opposite said gripping portion, said lever pivot connection to said table being located between said gripping portion and said detent pin.

3. The miter saw as defined in claim 2 wherein said gripping portion extends away from said handle portion when said detent pin is engaged with one of said detents, a user moves said detent pin out of engagement with one of said detents when said gripping portion is moved toward said handle portion by tightening the fingers of the one hand toward the palm of the hand.

4. The miter saw as defined in claim 3 wherein said spring is a compression spring interposed between said table and said lever, said spring contacting said lever between said lever pivot connection and said gripping end.

5. The miter saw as defined in claim 2 wherein said detent system further comprises a rotatable locking knob positioned at said handle portion, said locking knob being attached to an elongated rod threadedly mounted in said front extension of said table and extends to operatively contact said base and selectively lock said table in a desired position responsive to a user rotating said knob to tighten or loosen contact of said rod to said base.

6. The miter saw as defined in claim 2 wherein said lever pivot connection is located approximately one third of the length of the lever from the detent pin.

7. The miter saw as defined in claim 1 wherein said gripping portion has a protrusion extending upwardly adjacent said override pin and said hook structure has a hook extension configured to engage said protrusion and prevent said button from being moved unless and until said lever is moved toward said handle portion said sufficient distance.

8. The miter saw as defined in claim 7 wherein said detent system further comprises a detent pivot connection for pivotably mounting said button and hook structure in said recess, said detent pivot connection extending between said side walls of said front extension of said table.

9. A miter saw as defined in claim 8 wherein said detent system further comprises a torsion spring associated with said detent pivot connection for biasing said button and hook structure so that said hook structure is biased away from said detent override pins.

10. The miter saw comprising:
a base having a center pivot and a plurality of detents concentrically arranged at spaced angular positions at a generally predetermined distance from said center pivot;
a table mounted to said base and configured to be rotatable around said center pivot, said table having a front extension with a handle portion configured to enable a user to angularly adjust the position of said table relative to said base;
a detent system mounted to said table and comprising a moveable lever with a gripping portion located below and adjacent to said handle portion, said lever having an associated detent pin, said detent pin being configured to selectively engage said detents to hold said table at a predetermined angular position when engaged with one of said detents, wherein said moveable lever is elongated and is pivotably connected to said table at a lever pivot connection, said associated detent pin being located on an end opposite said gripping portion, said lever pivot connection to said table being located between said gripping portion and said detent pin;
a spring configured to bias said moveable lever and associated detent pin toward engagement with said detents;
a detent override mechanism for retaining said moveable lever and associated detent pin out of engagement with said detents, said override mechanism comprising a moveable button positioned on the top of said handle portion;
whereby a user can grasp said handle portion and gripping portion and move said lever with one hand and simultaneously move said button with the thumb of the one hand to retain said lever and associated detent pin out of engagement with any of said detents;
wherein said front extension of said table has a recess in the front top portion thereof defined by opposite side walls, a back wall and a shorter front wall, said detent override mechanism having said moveable button and a hook structure mounted on said moveable button and being pivotably mounted in said recess, said hook structure extending downwardly from said handle portion and configured to pivotably contact and hold said gripping end of said lever, wherein said gripping portion has two detent override pins spaced apart from one another and generally aligned and formed in an upper region of said gripping portion and configured to be contacted and held by said hook structure when a user moves said moveable button while said gripping portion of said lever is moved toward said handle portion a sufficient distance so that said hook structure can contact and hold said two detent override pins, said hook structure having two spaced apart hook portions for contacting an underside of said two detent override pins.

11. The miter saw as defined in claim 10 wherein said gripping portion has a protrusion extending upwardly adjacent one of said two detent override pins and said hook structure has a hook extension configured to engage said protrusion and prevent said button from being moved unless and until said lever is moved toward said handle portion said sufficient distance.

12. The miter saw as defined in claim 10 wherein said detent system further comprises a detent pivot connection for pivotably mounting said button and hook structure in said recess, said detent pivot connection extending between said side walls of said front extension of said table.

13. The miter saw as defined in claim 12 wherein said detent system further comprises a torsion spring associated with said detent pivot connection for biasing said button and hook structure so that said hook structure is biased away from said detent override pins.

14. The miter saw as defined in claim 13 wherein said torsion spring has a spiral center portion and elongated end portions, one end thereof bearing against said front wall and the other end portion bearing against one of said button and said hook structure.

15. The miter saw as defined in claim 14 wherein said hook structure has a recess for receiving one of said elongated end portions.

16. The miter saw as defined in claim 10 wherein said two detent override pins are spaced apart a predetermined distance to define a center gap through which an elongated rod can be located.

17. The miter saw as defined in claim 10 wherein said button is configured to be snap fitted to said hook structure.

18. The miter saw as defined in claim 10 wherein said hook portions have an upwardly curved top surface which inhibits disengagement from said detent override pins when said hook portions are contacting the underside of said detent override pins.

19. The miter saw as defined in claim 10 wherein said button and hook structure are made from a plastic material.

20. A miter saw comprising:
a base having a center pivot and a circumferential surface with plurality of detents arranged at spaced angular positions;
a table mounted to said base and configured to be rotatable around said center pivot, said table having a front handle portion configured to enable a user to angularly adjust the position of said table relative to said base;
a detent system mounted to said table and comprising an elongated pivotable lever with a gripping portion at one end located adjacent to the underside of said handle portion, said lever having a detent pin located at an opposite end, said detent pin being configured to be selectively inserted into said detents to hold said table at a predetermined angular position, said gripping portion including two detent override pins spaced apart and generally aligned and formed in an upper region of said gripping portion;
a spring configured to bias said lever and detent pin toward insertion in said detents;
a detent override mechanism for retaining said pivotable lever and detent pin from being inserted in said detents when engaged, said override mechanism comprising a depressible button positioned on the top of said handle portion, a bias mechanism, and a hook structure mounted on said depressible button and having two spaced apart hook portions, wherein said two spaced apart hook portions are configured to contact an underside of said two detent override pins;
whereby a user can grasp said handle portion and pull said gripping portion of said lever toward said handle portion with one hand and simultaneously depress said button with the thumb of the one hand to engage said detent override mechanism and retain said lever and detent pin from being inserted into any of said detents, wherein said depressible button is configured to move from a first position to a second position in response to depression of said button and to move from said second position to said first position when the user pulls said gripping portion of said lever toward said handle portion.

21. The miter saw as defined in claim 20 wherein said bias mechanism further comprises a spring for biasing said button toward said first position, said bias mechanism disengaging when the a user subsequently pulls said gripping portion of said lever toward said handle portion.

* * * * *